United States Patent [19]
Perry

[11] Patent Number: 6,054,978
[45] Date of Patent: Apr. 25, 2000

[54] COMPUTER MOUSE WITH IMPROVED BALL LOCK

[76] Inventor: Robert C. Perry, 5755 SW. Willow La., Lake Oswego, Oreg. 97035-5340

[21] Appl. No.: 09/290,382

[22] Filed: Apr. 12, 1999

[51] Int. Cl.[7] ...................................................... G09G 5/08
[52] U.S. Cl. ............................................................. 345/163
[58] Field of Search .................................. 345/163, 164, 345/165, 166, 167, 168, 169, 156, 157, 184; 74/471 XY; 273/148 B

[56] References Cited

U.S. PATENT DOCUMENTS

| | | | |
|---|---|---|---|
| 5,381,159 | 1/1995 | Oohori | 345/163 |
| 5,486,845 | 1/1996 | Chait | 345/163 |
| 5,610,632 | 3/1997 | Perry | 345/163 |
| 5,734,374 | 3/1998 | Chambers | 345/163 |
| 5,867,147 | 2/1999 | Schivley | 345/163 |

*Primary Examiner*—Xiao Wu
*Attorney, Agent, or Firm*—Smith-Hill and Bedell

[57] ABSTRACT

A mouse body includes a housing having a bottom wall formed with an opening which is surrounded by a recess in the bottom wall. An outer annular disk is fitted in the recess and adhesively bonded to the bottom wall of the mouse body. The annular disk has an inner peripheral surface that surrounds a circular aperture in the annular disk and connects an inner main surface of the annular disk to an outer main surface of the annular disk. An inner split lock ring has a relaxed state, in which the lock ring is larger than the aperture in the annular disk, and a compressed state, in which the lock ring can be placed in the aperture. When the lock ring is in the aperture, it can be released to an intermediate state, in which an outer surface of the lock ring engages the annular disk at the periphery of the circular aperture.

8 Claims, 2 Drawing Sheets

COMPUTER MOUSE WITH IMPROVED BALL LOCK

BACKGROUND OF THE INVENTION

This invention relates to a computer mouse with an improved ball lock.

A computer mouse is widely used as a pointing device with personal computers. A common form of computer mouse comprises a housing for gripping in the user's hand and sliding over a mouse pad. The housing has a bottom wall that confronts the mouse pad. The bottom wall of the housing is formed with a recess that contains a removable retainer plate or ball lock. The retainer plate is formed with a circular hole which is somewhat smaller than the diameter of a mouse ball that is located inside the housing and allows the mouse ball to protrude from the housing while remaining captive within the housing. When the retainer plate is removed, the mouse ball can be removed from the housing.

The conventional retainer plate is coupled to the bottom wall of the housing using a bayonet-type coupling. The retainer plate includes bayonet coupling lugs and corresponding slots are formed in the base of the recess in the bottom wall of the housing. The retainer plate is engaged with the bottom wall of the housing by placing the plate in the recess, with the bayonet coupling lugs in the slots respectively, and then rotating the plate through about 45° in the clockwise direction. Similarly, the retainer plate can be disengaged by rotating the retainer plate through an angle of about 45° in the counterclockwise direction.

The ease with which the retainer plate can be disengaged from the bottom wall of the housing is advantageous because it allows the mouse ball to be removed for cleaning without need for special tools. However, in some respects this feature can also be a disadvantage, particularly when applied to a computer mouse that is used in a school, because if the mouse ball can be easily removed for cleaning by a teacher or technician, it can also be easily removed by a curious or bored student whose plans do not include cleaning and replacing the mouse ball. If unauthorized removal of a mouse ball is not detected by a teacher or other person having reason to ensure that the mouse ball is promptly replaced, the ball might be misplaced and it might then be necessary to obtain either a new mouse ball or replace the entire mouse.

U.S. Pat. No. 5,610,532 and U.S. Pat. No. 5,668,575 each disclose a seal for resisting removal of the retainer plate from the opening in the bottom wall.

U.S. Pat. No. 5,867,147 discloses a mouse in which the retainer plate is configured so that it is essentially free of gripping surfaces that would facilitate removal of the disk by human fingers and has sockets which can be engaged by a special tool to allow authorized personnel to remove the retainer plate.

SUMMARY OF THE INVENTION

According to a first aspect of the present invention there is provided a mouse body comprising a housing having a bottom wall formed with an opening which is surrounded by a recess in the bottom wall, an outer annular disk fitted in the recess and adhesively bonded to the bottom wall of the mouse body, the annular disk having an inner peripheral surface that surrounds a circular aperture in the annular disk and connects an inner main surface of the annular disk to an outer main surface of the annular disk, and an inner split lock ring having a relaxed state, in which the lock ring is larger than the aperture in the annular disk, and a compressed state, in which the lock ring can be placed in the aperture and released to an intermediate state, in which an outer surface of the lock ring engages the annular disk at the periphery of the circular aperture.

According to a second aspect of the present invention there is provided a ball lock for a mouse body including a housing having a bottom wall formed with an opening which is surrounded by a recess in the bottom wall, said ball lock comprising an outer annular disk that can be fitted in the recess and adhesively bonded to the bottom wall of the mouse body, the annular disk having an inner peripheral surface that surrounds a circular aperture in the annular disk and connects an inner main surface of the annular disk to an outer main surface of the annular disk, and an inner split lock ring having a relaxed state, in which the lock ring is larger than the aperture in the annular disk, and a compressed state, in which the lock ring can be placed in the aperture and released to an intermediate state, in which an outer surface of the lock ring engages the annular disk at the periphery of the circular aperture.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 1:
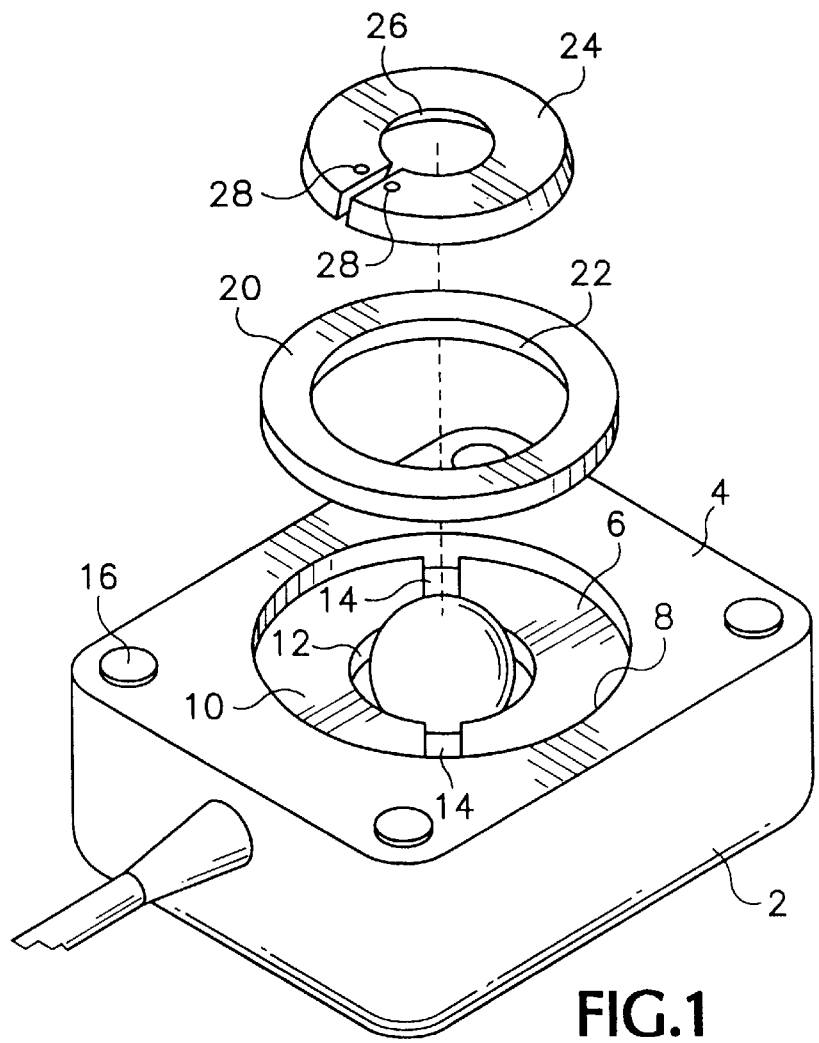
FIG. 1 is a partially exploded bottom perspective view of a first mouse in accordance with the present invention.
Figure 2:
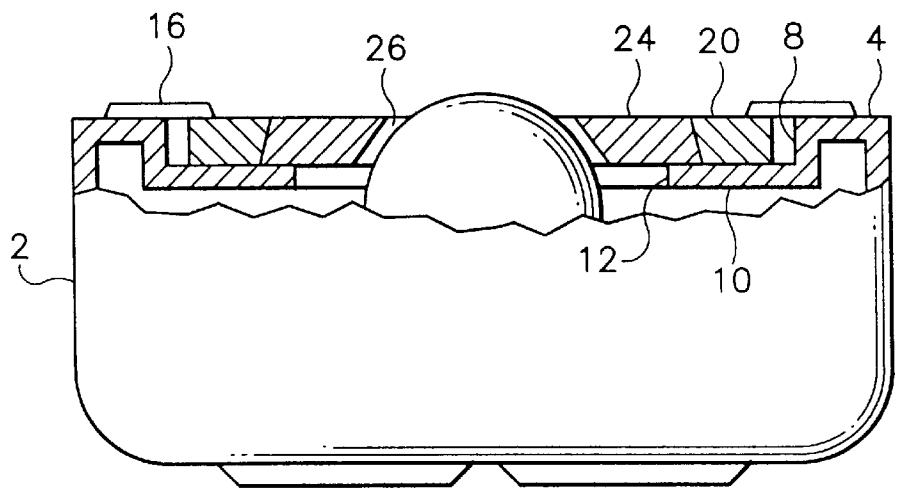
FIG. 2 is a partially broken away end view of the mouse shown in FIG. 1.

The computer mouse shown in FIGS. 1 and 2 comprises a housing 2 which is made of a synthetic polymer material and has a bottom wall 4 formed with a recess 6. The recess 6 is bounded by a circular rim 8 which is about 1.4 inches in diameter. The recess 6 has a base 10 which is formed with a circular opening 12 and with notches 14 for receiving the bayonet coupling lugs of a conventional retainer plate. Raised feet or gliders 16 project from the bottom wall 4 of the housing and slide on a mouse pad or other driving surface when the mouse is in use for supporting the mouse with the main area of the bottom wall confronting the driving surface and spaced slightly therefrom. The gliders 16 may include inserts (not shown) of PTFE or other low friction material.

The retainer plate or ball lock of the mouse shown in FIGS. 1 and 2 is a composite structure made up of an outer annular disk 20, which has an inner peripheral surface surrounding an inner aperture 22, and a split lock ring 24 which can be removably fitted in the aperture 22. The annular disk 20 and the split lock ring 24 are made of synthetic polymer material.

The annular disk 20 is sized to fit in the recess 6 in the bottom wall of the mouse housing and serves as an adapter for providing a standard size inner aperture regardless of the diameter of the recess in the bottom wall of the mouse. Thus, the external diameter of the annular disk 20 is selected to be slightly smaller than the diameter of the smallest recess of a standard, commercially available mouse. The annular disk 20 is placed in the recess so that it is centrally located relative to the circular rim 8 and is held in position by gluing.

The split lock ring 24 is generally C-shaped, with the jaws of the C being slightly spaced when the lock ring is in a relaxed condition. Adjacent the jaws of the C, the lock ring is formed in its outer main surface with two sockets 28, which are sized to receive the jaws of a squeezing tool, such as internal compression pliers sold by Millbar Specialty Hand Tools of Chagrin Falls, Ohio. By fitting the jaws of the squeezing tool in the sockets, the jaws of the C can be squeezed together into contact. In this condition, the lock ring is small enough to fit in the aperture 22 of the annular disk. Thus, when the lock ring is squeezed, it can be inserted in the aperture of the annular disk. When the lock ring is released, it springs open and the outer peripheral surface of the lock ring engages the inner peripheral surface of the annular disk.

The aperture 22 of the annular disk 20 tapers slightly from the inner main surface of the annular disk to the outer main surface of the annular disk. Typically, the taper is in the range 9–12°. The outer peripheral surface of the lock ring has a taper that matches the taper of the aperture 22. When the lock ring 24 springs open, its outer peripheral surface acts against the inner peripheral surface of the annular disk with a force having a component that tends to push the lock ring 24 into the interior of the mouse housing 2.

The maximum diameter of the aperture 22 in the annular disk is greater than the diameter of the opening 12 in the base of the recess 6. Therefore, the force generated by the lock ring 24 bearing against the annular disk 20 pushes the lock ring against the base 10 of the recess, and the base 10 keeps the lock ring in place in the aperture 22 of the annular disk. The lock ring cannot be removed non-destructively from the aperture 22 except by squeezing the jaws of the lock ring together.

The hole 26 in the split lock ring 24 is sized to allow the mouse ball to protrude through the hole.

Figure 3:
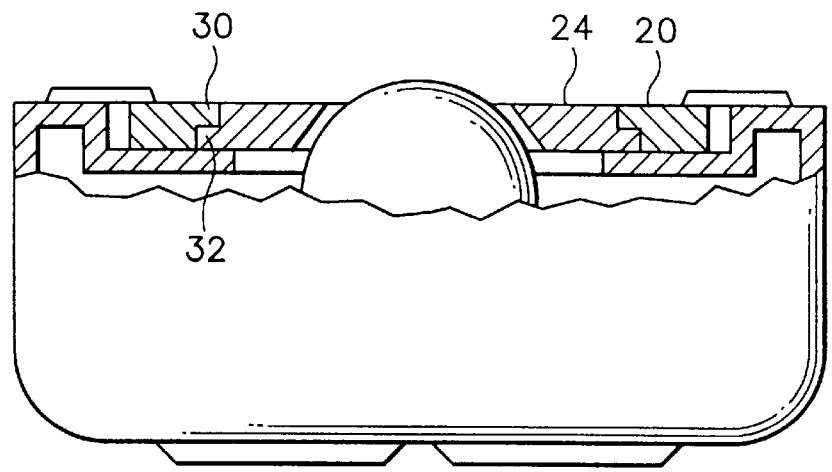
FIG. 3 is a view similar to FIG. 2 of a second mouse in accordance with the present invention.

FIG. 3 shows a modified form of the mouse shown in FIGS. 1 and 2. In the case of FIG. 3, the aperture of the annular disk 20 does not have a uniform taper, as in the case of FIGS. 1 and 2. Instead, the annular disk has an internal flange 30 such that an annular recess is formed between the flange 30 and the base 10 of the recess 6. The lock ring 24 has an outer lip 32 that fits in the annular recess and prevents removal of the lock ring unless it is squeezed. In this manner, the lock ring is positively locked in the aperture of the annular disk.

It will be appreciated that in the case of FIG. 3 the lock ring 24 will be retained in the aperture 22 even if there is a small degree of play between the lock ring and the annular disk 20.

Figure 4:
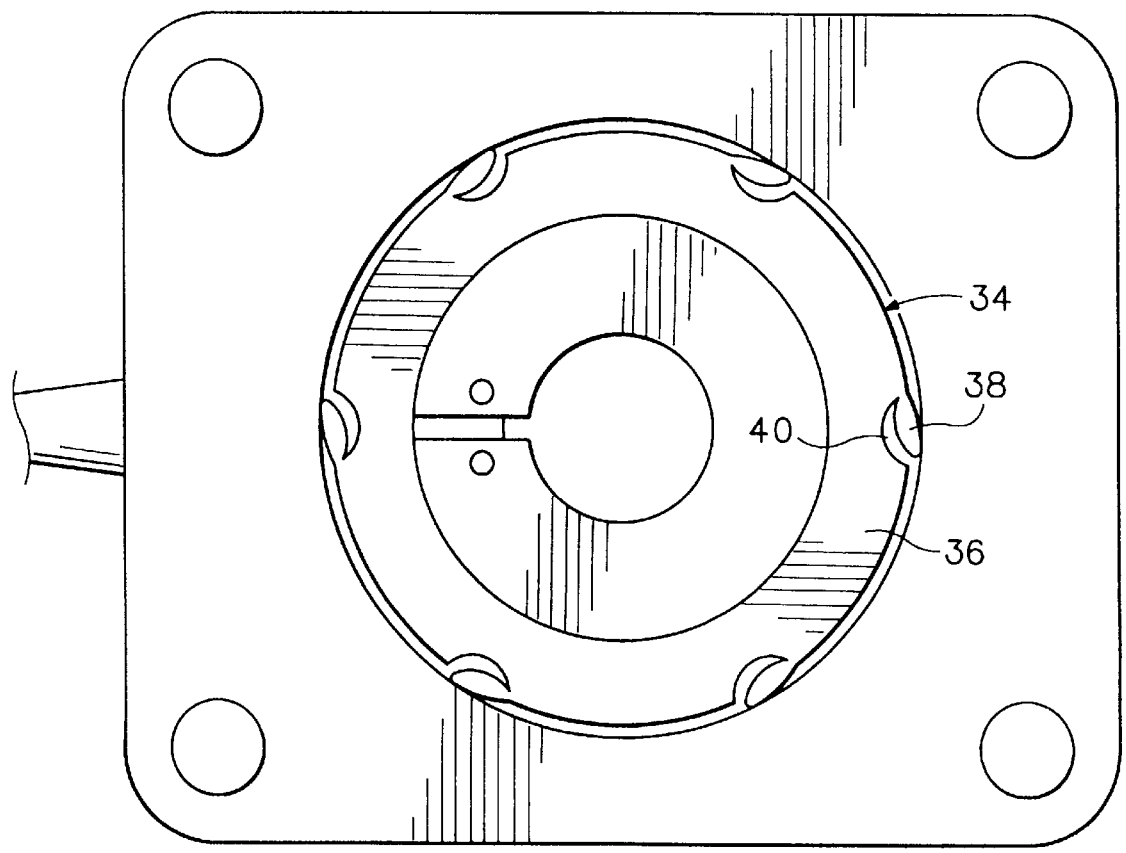
FIG. 4 is a bottom plan view of a third mouse in accordance with the present invention.

For proper operation of the mouse, it is necessary that the hole 26 in the lock ring be accurately centered relative to the rim 8 of the recess 6. Although this can be accomplished by carefully gauging the position of the annular disk 20 relative to the rim 8 of the recess 6, it is more convenient if the annular disk 20 is self-centering. FIG. 4 shows a modification of the composite retainer plate in which the annular disk is self-centering. As shown in FIG. 4, the annular disk 34 includes a main body 36 having a generally circular outer periphery and several fingers or tabs 38 which project from the main body of the annular disk. The fingers 38 are resilient, and in the relaxed condition, the fingers 38 project well beyond the circular outer periphery of the main body of the annular disk 34. The fingers 38 can be pressed into complementary recesses 40 in the outer periphery of the main body 36.

Glue is applied to the base 10 of the recess in the bottom wall of the housing, as in the case of FIG. 1, and the annular disk 34 is fitted in the recess. This is accomplished by pressing the fingers 38 at least partially into their respective recesses 40. When the fingers 38 are released, the spring force generated by engagement of the fingers 38 against the rim 8 of the recess centers the annular disk 34 in the recess.

The composite retainer plate allows the mouse ball to be removed for cleaning yet is virtually impossible to remove without the proper tool for engaging the sockets and squeezing the jaws of the lock ring together.

It will be appreciated that the invention is not restricted to the particular embodiment that has been described, and that variations may be made therein without departing from the scope of the invention as defined in the appended claims and equivalents thereof.

What is claimed is:

1. A mouse body comprising:

a housing having a bottom wall formed with an opening which is surrounded by a recess in the bottom wall, an outer annular disk fitted in the recess and adhesively bonded to the bottom wall of the mouse body, the annular disk having an inner peripheral surface that surrounds a circular aperture in the annular disk and connects an inner main surface of the annular disk to an outer main surface of the annular disk, and an inner split lock ring having a relaxed state, in which the lock ring is larger than the aperture in the annular disk, and a compressed state, in which the lock ring can be placed in the aperture and released to an intermediate state, in which an outer surface of the lock ring engages the annular disk at the periphery of the circular aperture.

2. A mouse body according to claim 1, wherein the inner peripheral surface of the annular disk tapers from the inner main surface of the annular disk to the outer main surface of the annular disk and the outer surface of the lock ring is complementary to the inner peripheral surface of the annular disk.

3. A mouse body according to claim 1, wherein the annular disk has an internal flange at the inner periphery of the circular aperture, the flange being outward of the inner main surface of the annular disk, whereby an annular recess is formed between the flange and the bottom wall of the housing, and the outer surface of the lock ring is formed with a lip for engaging the annular recess.

4. A mouse body according to claim 1, wherein the recess in the bottom wall of the mouse body is surrounded by a rim and the annular disk includes a main body having a generally circular outer periphery and at least three spring fingers projecting outward of the generally circular outer periphery for engaging the rim and centering the annular disk in the recess.

5. A ball lock for a mouse body including a housing having a bottom wall formed with an opening which is surrounded by a recess in the bottom wall, said ball lock comprising:

an outer annular disk that can be fitted in the recess and adhesively bonded to the bottom wall of the mouse body, the annular disk having an inner peripheral surface that surrounds a circular aperture in the annular disk and connects an inner main surface of the annular disk to an outer main surface of the annular disk, and an inner split lock ring having a relaxed state, in which the lock ring is larger than the aperture in the annular disk, and a compressed state, in which the lock ring can be placed in the aperture and released to an intermediate state, in which an outer surface of the lock ring engages the annular disk at the periphery of the circular aperture.

6. A ball lock according to claim 5, wherein the inner peripheral surface of the annular disk tapers from the inner main surface of the annular disk to the outer main surface of the annular disk and the outer surface of the lock ring is complementary to the inner peripheral surface of the annular disk.

7. A ball lock according to claim 5, wherein the annular disk has an internal flange at the inner periphery of the circular aperture, the flange being outward of the inner main surface of the annular disk, whereby an annular recess can be formed between the flange and the bottom wall of the housing when the annular disk is fitted in the recess in the bottom wall of the housing, and the outer surface of the lock ring is formed with a lip for engaging the annular recess.

8. A ball lock according to claim 5, wherein the annular disk includes a main body having a generally circular outer periphery and at least three spring fingers projecting outward of the generally circular outer periphery for engaging a rim surrounding the recess in the bottom wall of the mouse body and centering the annular disk in the recess.

* * * * *